(12) United States Patent
Abe et al.

(10) Patent No.: US 8,675,163 B2
(45) Date of Patent: *Mar. 18, 2014

(54) DISPLAY DEVICE

(71) Applicants: Hiroyuki Abe, Chiba (JP); Daisuke Mutou, Mobara (JP); Takamitsu Kamada, Mobara (JP)

(72) Inventors: Hiroyuki Abe, Chiba (JP); Daisuke Mutou, Mobara (JP); Takamitsu Kamada, Mobara (JP)

(73) Assignees: Japan Display Inc., Tokyo (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,163

(22) Filed: Dec. 10, 2012

(65) Prior Publication Data

US 2013/0100389 A1 Apr. 25, 2013

Related U.S. Application Data

(63) Continuation of application No. 12/563,257, filed on Sep. 21, 2009, now Pat. No. 8,330,915.

(30) Foreign Application Priority Data

Sep. 22, 2008 (JP) ................................. 2008-242357

(51) Int. Cl.
*G02F 1/1333* (2006.01)
(52) U.S. Cl.
USPC ........................................... 349/138; 349/187
(58) Field of Classification Search
USPC ...................... 349/138, 149, 187; 257/59, 72
See application file for complete search history.

(56) References Cited

U.S. PATENT DOCUMENTS

| 5,361,150 A | 11/1994 | Noguchi |
| 6,057,896 A | 5/2000 | Rho et al. |
| 6,630,977 B1 | 10/2003 | Yamazaki et al. |
| 8,330,915 B2 | 12/2012 | Abe et al. ...................... 349/138 |
| 2004/0056993 A1 | 3/2004 | Kim et al. |
| 2009/0033855 A1* | 2/2009 | Kaneko et al. ................ 349/138 |

FOREIGN PATENT DOCUMENTS

JP 2734183 1/1998

* cited by examiner

*Primary Examiner* — Michael Caley
(74) *Attorney, Agent, or Firm* — Antonelli, Terry, Stout & Kraus, LLP.

(57) ABSTRACT

A liquid crystal display device capable of preventing the occurrence of crack in a capacitor insulating film due to laser marking is provided. The liquid crystal display device includes pixels arranged in a matrix in a display region above a substrate, a thin film layer formed in a non-display region excluding the display region, and a transparent insulating film extending from the display region to the non-display region and formed on the thin film layer, in which the transparent insulating film includes at least an organic insulating film formed of an organic compound for planarizing a surface of the substrate, an inorganic insulating film which is a thin film formed on the organic insulating film and formed of an inorganic compound and formed with an opening extending to the organic insulating film in a region above the thin film layer, and a transparent electrode layer which is formed in the opening of the inorganic insulating film to cover the organic insulating film exposed from the opening of the inorganic insulating film.

19 Claims, 5 Drawing Sheets

DISPLAY DEVICE

CROSS-REFERENCE TO RELATED APPLICATIONS

The present application is a continuation of U.S. application Ser. No. 12/563,257, filed Sep. 21, 2009, and which application claims priority from Japanese Application JP 2008-242357 filed on Sep. 22, 2008, the contents of which are hereby incorporated by reference into this application.

BACKGROUND OF THE INVENTION

1. Field of the Invention

The present invention relates to a liquid crystal display device and more particularly to a liquid crystal display device having a writing region of identification information for managing a panel history.

2. Background Art

Conventional liquid crystal display devices include a first substrate formed with pixel electrodes and the like, a second substrate arranged to face the first substrate, and a liquid crystal layer interposed between the first substrate and the second substrate. At the first substrate, in each of regions surrounded by, for example, a plurality of gate lines extending in the x-direction and arranged in parallel in the y-direction and a plurality of drain lines extending in the y-direction and arranged in parallel in the x-direction, a pixel is configured with at least a thin film transistor which is turned on with a scanning signal from the gate line and a pixel electrode supplied with a video signal from the drain line via the turned-on thin film transistor. With this configuration, each of the pixels can be controlled independently, whereby an image is displayed with the pixels.

On the other hand, a black matrix and color filters of R (red), G (green), and B (blue) corresponding to each of the pixels are formed at the second substrate, whereby color display is performed depending on the amount of transmitted light transmitted through the color filters.

In the thus configured liquid crystal display devices, when a trouble has occurred in the liquid crystal display device incorporated into a final product such as a mobile phone, it is required to determine in a short time whether the trouble has been caused by conditions in manufacturing, etc. or has occurred accidentally. Therefore, history information on individual liquid crystal display devices is important.

However, in order to manage the history information on individual liquid crystal display devices, identification information such as a number unique to each of the individual liquid crystal display devices is assigned, and the histories of the liquid crystal display devices have to be managed individually based on the identification information.

A method for managing identification information on individual liquid crystal display devices is disclosed in, for example, Japanese Patent No. 2734183. In the method disclosed in Japanese Patent No. 2734183, a character pad for laser marking is formed by using an opaque film above a glass substrate. Further, a technique for protecting the character pad by using a transparent insulating film formed in a display region in common as an insulating film for protecting the character pad is disclosed.

SUMMARY OF THE INVENTION

In recent years, the use application of liquid crystal display devices has been increasingly extended along with the improved performance and reduced power consumption of the liquid crystal display devices. A liquid crystal display device having a higher performance has also been mounted on portable equipment such as a mobile phone.

On the other hand, portable equipment is required to reduce power consumption as well as to be driven at low voltage for enabling the use of the portable equipment for a long time with a limited battery capacity. Therefore, an approach for reducing power consumption and lowering voltage has been carried out for the liquid crystal display device. In lateral electric field type liquid crystal display panels, various kinds of countermeasures are taken to realize an efficient driving of liquid crystal molecules. For example, typical countermeasures are: to reduce the thickness of a capacitor insulating film formed between a common electrode and a pixel electrode; to use a capacitor insulating film of high dielectric constant; and to planarize the surface of the first substrate, which is required to narrow the distance between the first substrate (TFT substrate) and the second substrate (color filter substrate) arranged to face each other via the liquid crystal layer.

For planarizing the surface of the first substrate, when the pixel electrode and the common electrode for generating a lateral electric field which drives liquid crystal molecules are formed, for example, an organic insulating film using a photosensitive organic material such as polyimide or acrylic resin is formed to planarize the surface of the first substrate. Thereafter, an electrode for generating the electric field which drives liquid crystal molecules is formed, whereby the surface of the first substrate is planarized.

On the other hand, when identification information on a liquid crystal substrate is written to a laser marking base which is an information writing region for laser marking by using the technique disclosed in Japanese Patent No. 2734183, a crack occurs in an organic insulating film or a capacitor insulating film formed on the organic insulating film. As a result, the crack reaches a display region to cause a panel failure that a pixel is not lit, for example.

The invention has been made to solve the above-described problem, and it is an object of the invention to provide a liquid crystal display device capable of preventing the occurrence of crack when a transparent insulating film formed in a display region is used.

It is another object of the invention to provide a technique capable of preventing the failure of a liquid crystal display device due to laser marking.

In order to solve the above problem, according to a first aspect of the invention, a liquid crystal display device includes: pixels arranged in a matrix in a display region above a substrate; a thin film layer for laser writing formed in a non-display region excluding the display region; and a transparent insulating film extending from the display region to the non-display region and formed on the thin film layer, wherein the transparent insulating film includes at least an organic insulating film which is formed of an organic compound for planarizing a surface of the substrate, an inorganic insulating film which is a thin film formed on the organic insulating film and formed of an inorganic compound and formed with an opening extending to the organic insulating film in a region above the thin film layer, and a transparent electrode layer which is formed in the opening of the inorganic insulating film to cover the organic insulating film exposed from the opening of the inorganic insulating film.

In order to solve the above problem, according to a second aspect of the invention, a liquid crystal display device includes: pixels arranged in a matrix in a display region above a substrate; a thin film layer for laser writing formed in a non-display region excluding the display region; and a transparent insulating film extending from the display region to the non-display region and formed on the thin film layer, wherein the transparent insulating film includes at least an organic insulating film which is formed of an organic compound for planarizing a surface of the substrate, and an inorganic insulating film which is formed of an inorganic compound and formed on the organic insulating film, and a groove portion extending from the inorganic insulating film to the organic insulating film is formed so as to annularly surround the periphery of the forming region of the thin film layer.

In order to solve the above problem, according to a third aspect of the invention, a liquid crystal display device includes: pixels arranged in a matrix in a display region above a substrate; a thin film layer for laser writing formed in a non-display region excluding the display region; and a transparent insulating film extending from the display region to the non-display region and formed on the thin film layer, wherein the transparent insulating film includes at least an organic insulating film which is formed of an organic compound for planarizing a surface of the substrate, an inorganic insulating film which is formed of an inorganic compound, formed on the organic insulating film, and formed with an opening extending to the organic insulating film in a region above the thin film layer, and a transparent electrode film which is formed in the opening of the inorganic insulating film to cover the organic insulating film exposed from the opening of the inorganic insulating film, a groove portion extending from the inorganic insulating film to the organic insulating film is formed so as to annularly surround the periphery of the forming region of the thin film layer, and the groove portion is covered with the transparent electrode film.

In order to solve the above problem, according to a fourth aspect of the invention, in the liquid crystal display device according to any of the first to third aspects of the invention, the inorganic insulating film is formed of an inorganic compound having a higher dielectric constant than those of other inorganic insulating films formed in the display region.

In order to solve the above problem, according to a fifth aspect of the invention, in the liquid crystal display device according to any of the first to fourth aspects of the invention, the inorganic transparent insulating film is formed of an SiN thin film.

In order to solve the above problem, according to a sixth aspect of the invention, in the liquid crystal display device according to any of the first to fifth aspects of the invention, the inorganic transparent insulating film is a capacitor insulating film formed between a common electrode and a pixel electrode which constitute the pixel.

In order to solve the above problem, according to a seventh aspect of the invention, in the liquid crystal display device according to any of the first to sixth aspects of the invention, the thin film layer for laser writing is formed of Mo, a W alloy, Al, or an Al alloy.

In the liquid crystal display device according to the aspects of the invention, the inorganic insulating film is not formed only in the region above the writing layer, whereby the organic insulating film and the inorganic insulating film are prevented from being formed in contact with each other. As a result, even when the transparent insulating film formed in the display region is formed in the forming region of the writing layer, the occurrence of crack in laser writing can be prevented. Accordingly, the failure of the liquid crystal display device due to laser marking can be prevented.

Further in the liquid crystal display device according to the aspects of the invention, the groove is disposed at the periphery of the forming region of the writing layer. Therefore, even when a crack occurs in the inorganic insulating film or the organic insulating film, the crack stops at the groove, thereby being prevented from extending in the display region to cause display failure of pixel. As a result, when the transparent insulating film formed in the display region is formed also in the forming region of the writing layer, a defect pixel caused by the occurrence of crack in laser writing can be prevented from being generated. Accordingly, the failure of the liquid crystal display device due to laser marking can be prevented.

Other advantages of the invention will be apparent from the entire description.

DESCRIPTION OF THE PREFERRED EMBODIMENTS

Hereinafter, embodiments to which the invention is applied will be described with reference to the drawings. In the following description, the same constituent elements are denoted by the same reference numerals, and the repetitive description thereof is omitted.

(Embodiment 1)
(Overall Configuration)

Figure 1:
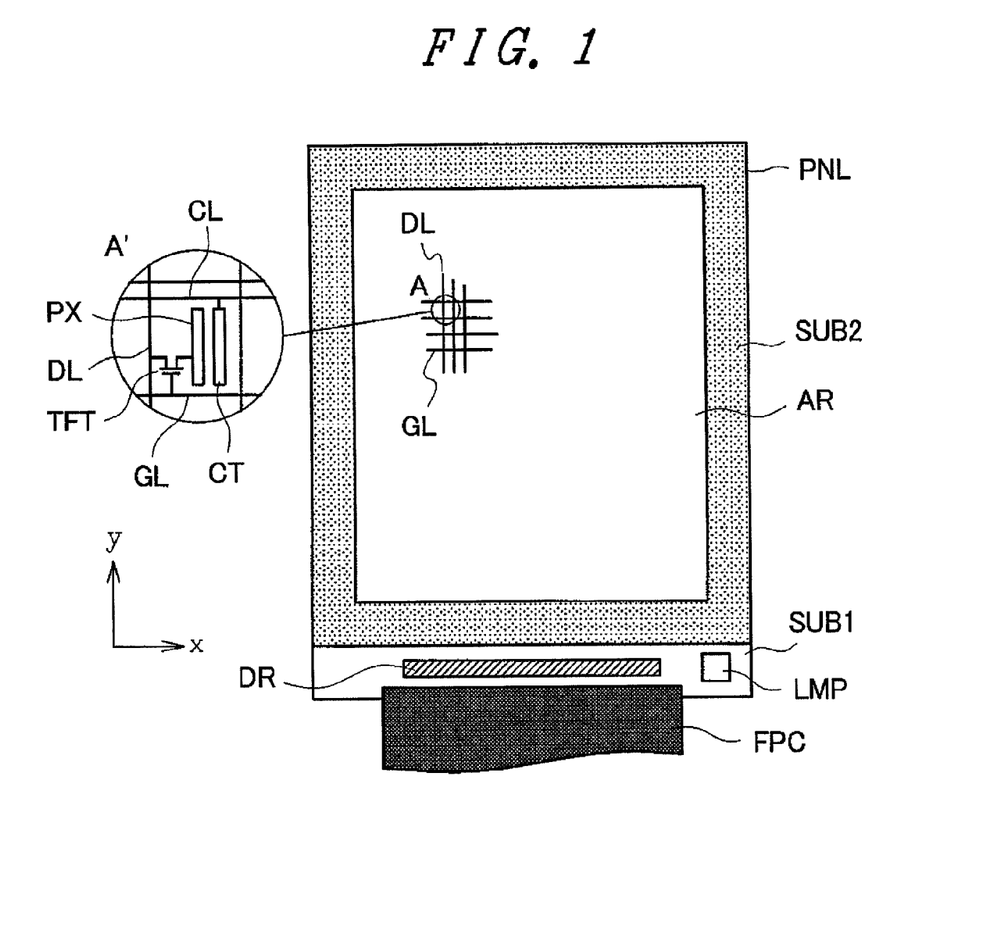
FIG. 1 is a plan view for explaining the schematic configuration of a liquid crystal display device of Embodiment 1 of the invention.

FIG. 1 is a plan view for explaining the schematic configuration of a liquid crystal display device of Embodiment 1 of the invention.

As shown in FIG. 1, the liquid crystal display device of Embodiment 1 has a liquid crystal display panel PNL including a first substrate SUB1 formed with pixel electrodes and the like, a second substrate SUB2 formed with not-shown color filters and a not-shown black matrix (light shielding film) and arranged to face the first substrate SUB1, and a not-shown liquid crystal layer interposed between the first substrate SUB1 and the second substrate SUB2. The liquid crystal display panel PNL and a not-shown backlight unit serving as a light source are combined together, whereby the liquid crystal display device is completed. The first substrate SUB1 and the second substrate SUB2 are fixed together with a not-shown sealing material which is annularly applied on the periphery portion of the second substrate SUB2, and also liquid crystal which is interposed between the two substrates SUB1 and SUB2 is sealed with the sealing material. In the following description, the liquid crystal display panel PNL is also described as the liquid crystal display device.

The first substrate SUB1 and the second substrate SUB2 are not limited to, for example, well-known glass substrates but may be other insulating substrates such as of quartz glass or plastic (resin). For example, when quartz glass is used, since it is possible to raise the process temperature, a later-described gate insulating film can be densified. Therefore, the reliability of a later-described thin film transistor TFT can be improved. When a plastic (resin) substrate is used, a liquid crystal display device which is light in weight and excellent in impact resistance can be provided.

In the liquid crystal display device of Embodiment 1, a region inside the region where the liquid crystal is sealed and formed with display pixels (hereinafter referred to as pixels) forms a display region AR. Accordingly, a region not formed with the pixels and not concerned with displaying is not the display region AR even inside the region where the liquid crystal is sealed.

As is apparent from FIG. 1, in the liquid crystal display device of Embodiment 1, a marking portion where a laser marking base LMP (thin film layer for laser writing) is formed is formed on the first substrate SUB1. The forming position of the marking portion is a region outside the display region AR. Further in the liquid crystal display device of Embodiment 1, the marking portion is formed in a region outside a region where the first substrate SUB1 and the second substrate SUB2 which are arranged to face each other via the liquid crystal layer are overlapped with each other. In this manner, the marking portion is formed in the region while avoiding not only the display region AR but also the overlapped region of the first substrate SUB1 and the second substrate SUB2, whereby it is possible to easily prevent the overlap of the sealing material with the forming position of the laser marking base LMP. Further, the marking portion is disposed in the region while avoiding the overlapped region of the first substrate SUB1 and the second substrate SUB2, whereby the visibility of the laser marking base LMP from a display surface side of the liquid crystal display device of Embodiment 1 is prevented from decreasing.

The forming position of the laser marking base LMP is not limited to the right lower end portion of the liquid crystal display panel PNL but may be other portion, such as the left lower end portion, excluding the display region AR and the forming region of connecting terminals of a flexible printed board FPC.

In the liquid crystal display device of Embodiment 1 shown in FIG. 1, gate lines GL extending in the x-direction in the drawing and arranged in parallel in the y-direction are formed on a surface of the first substrate SUB1 on a liquid crystal side inside the display region AR. In addition, drain lines DL extending in the y-direction in the drawing and arranged in parallel in the x-direction are formed.

Rectangular regions surrounded by the drain lines DL and the gate lines GL constitute a region formed with the pixels, whereby the pixels are arranged in a matrix in the display region AR. As shown in an enlarged view A', for example in a circle A portion in FIG. 1, the pixel includes a thin film transistor TFT, a pixel electrode PX, and a common electrode CT. The thin film transistor TFT is turned on with a scanning signal from the gate line GL. The pixel electrode PX is supplied with a video signal from the drain line DL via the turned-on thin film transistor TFT. The common electrode CT is connected to a common line CL and supplied with a reference signal which has a potential serving as a reference for the potential of the video signal. Although the common electrode CT shown in the enlarged view A' is configured such that the reference signal is input to the common electrode CT which is independently formed for each of the pixels via the common line CL, this is not restrictive. As will be described later, the common electrode CT may be formed such that the common electrodes CT in the pixels adjacently arranged in the x-axis direction are directly connected with one another to input with the reference signal from one end of right and left ends in the x-axis direction (ends of the first substrate) or from both ends via the common line CL.

In Embodiment 1, each of the drain lines DL and gate lines GL extends over the not-shown sealing material at, for example, the lower end thereof and is connected to one output terminal of a driver IC (composed of scanning signal drive circuits, video signal drive circuits, and the like) DR.

In the liquid crystal display device of Embodiment 1, the flexible printed board FPC is connected at the lower end portion. A driving signal for the driver IC DR is input via the flexible printed board FPC. The driver IC DR composed of scanning signal drive circuits and video signal drive circuits can be configured by mounting semiconductor devices each composed of a semiconductor chip on the surface of the first substrate SUB1. However, for example, one side of a semiconductor device which is formed by a tape carrier method or a COF (Chip On Film) method may be connected to the first substrate SUB1. Circuits may be integrally formed on the first substrate SUB1.

(Configuration of Level Difference and Pixel)

Figure 2:
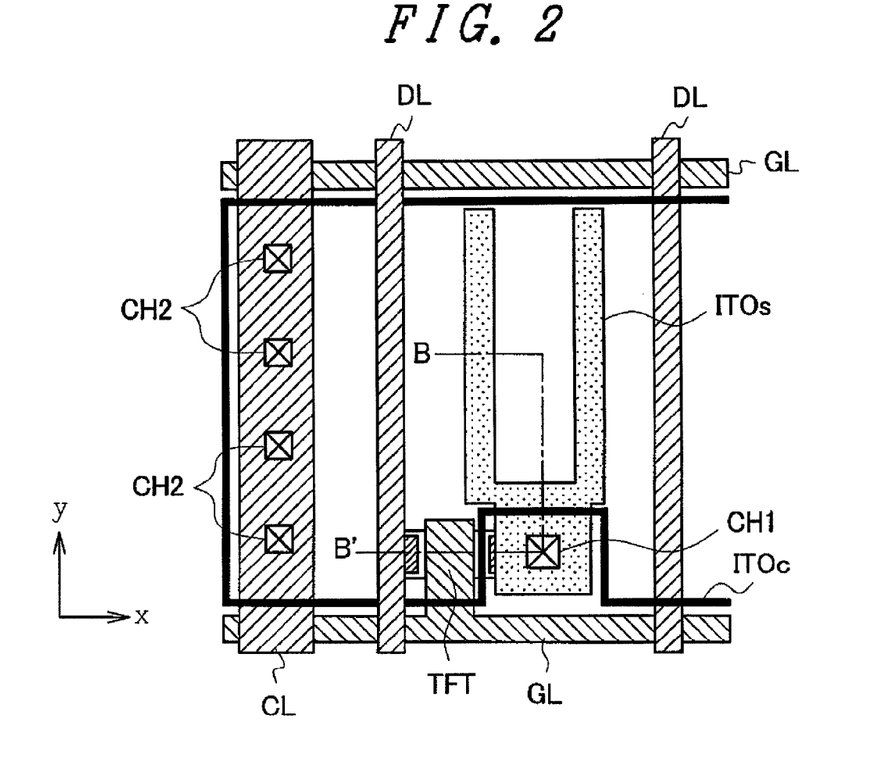
FIG. 2 is a plan view for explaining the schematic configuration of a pixel in the liquid crystal display device of Embodiment 1 of the invention.
Figure 3:
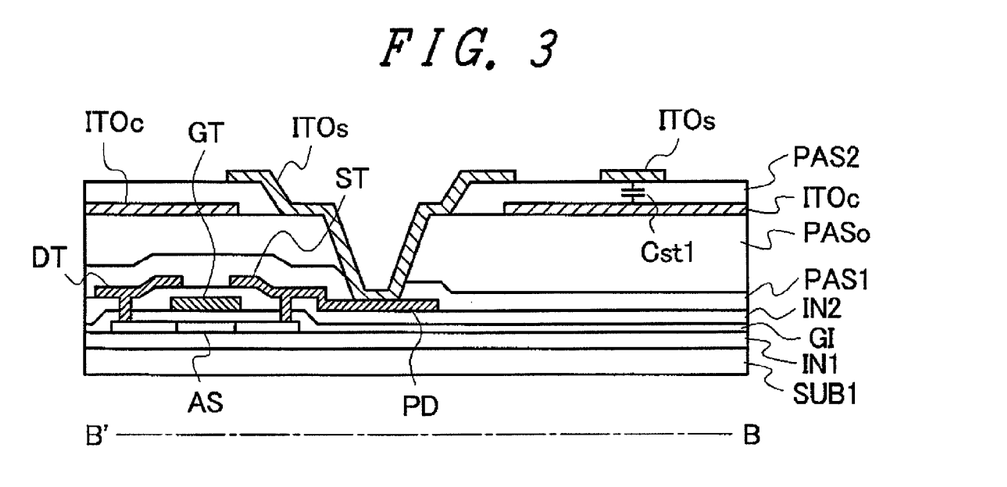
FIG. 3 is a cross sectional view taken along the line B-B' in FIG. 2 for explaining the schematic configuration of the pixel in a display region in the liquid crystal display device of Embodiment 1 of the invention.

FIG. 2 is a plan view for explaining the schematic configuration of a pixel in the liquid crystal display device of Embodiment 1. FIG. 3 is a cross sectional view taken along the line B-B' in FIG. 2. Thin films shown below can be formed by a well-known photolithography technique, and therefore the detailed description of the forming method is omitted.

As shown in FIG. 2, the gate lines GL and the drain lines DL are formed in parallel with a relatively large distance on the surface (upper surface) of the first substrate SUB1 on the liquid crystal side.

In the region surrounded by the gate lines GL and the drain lines DL, a transparent conductive film ITOc formed of a transparent conductive material such as, for example, ITO (Indium-Tin-Oxide) and serving as the common electrode CT is formed. The transparent conductive film ITOc is overlapped with the common line CL at the side portion thereof on the common line CL side and electrically connected to the common line CL via contact holes CH2. Although the description will be made on the case where ITO is used for a transparent conductive film, this is not restrictive. A well-known ZnO-type transparent conductive film may be used.

As shown in FIG. 3, an insulating film IN1 serving as an under layer is formed on the surface of the first substrate SUB1 in order to block the mixing of ions such as of Na (sodium) or K (potassium) from the first substrate SUB1 into the thin film transistor TFT. As the insulating film IN1, for example, a thin film having a structure in which a layer formed of silicon nitride or the like and a layer formed of silicon oxide or the like are stacked in this order from the first substrate SUB1 side can be used, but this is not restrictive.

A polycrystalline semiconductor layer AS formed of, for example, polysilicon is formed on the insulating film IN1. The semiconductor layer AS serves as the semiconductor layer of the thin film transistor TFT. In addition to the forming region of the thin film transistor TFT, the semiconductor layer AS is also formed, for example, under the drain line DL and under a connecting portion which electrically connects the drain line DL with a drain electrode DT of the thin film transistor TFT (these semiconductor layers are hereinafter referred to as polysilicon layers for distinguishing from the semiconductor layer AS). The polysilicon layer is formed such that a difference in level can be reduced in, for example, the drain line DL.

An insulating film GI is formed on the semiconductor layer AS so as to cover the semiconductor layer AS. The insulating film GI functions as a gate insulating film of the thin film transistor TFT, which will be described later, in the forming region of the thin film transistor TFT. The film thickness of the insulating film GI and the like can be set corresponding to the gate insulating film. A gate electrode GT is formed on the upper surface of the insulating film GI in a portion overlapped with the semiconductor layer AS. An inter-layer insulating film IN2 is formed on the gate electrode GT. For example, silicon oxide ($SiO_2$), silicon nitride (SiN), tetraethoxysilane (TEOS), or the like is preferable for the inter-layer insulating film IN2.

The drain lines DL are formed so as to extend in the y-direction in FIG. 2. The drain line DL has an extended portion extended to the thin film transistor TFT side at the part thereof. The extended portion is connected to a drain region formed in the semiconductor layer AS via a contact hole formed through the insulating film GI and the inter-layer insulating film IN2. The drain line DL intersects the gate line GL in a region in the vicinity of the thin film transistor TFT via the insulating film GI and the polysilicon layer.

A source electrode ST which is formed simultaneously when the drain lines DL and the drain electrode DT are formed is formed at a position facing the drain electrode DT on the semiconductor layer AS. The source electrode ST is connected to a source region formed in the semiconductor layer AS via the contact hole formed through the insulating film GI and the inter-layer insulating film IN2. The source electrode ST has an extended portion slightly extended from a portion above the semiconductor layer AS to a pixel region side. The extended portion reaches a pad PD connected to a transparent conductive film ITOs serving as the pixel electrode PX which will be described later.

A protective film which is formed of an inorganic insulating film PAS1 formed of an inorganic compound and covering the thin film transistor TFT and an organic insulating film PASo functioning as a planarization film is formed on the drain electrode DT and the source electrode ST, that is, on the thin film transistor TFT. The inorganic insulating film PAS1 protects the thin film transistor TFT against not-shown liquid crystal or an alkali component of the organic insulating film PASo. The inorganic insulating film PAS1 is formed of, for example, a silicon nitride (SiN) film or the like as an inorganic material and formed on the entire surface of the thin film transistor TFT. The organic insulating film PASo is formed on the inorganic insulating film PAS1 (liquid crystal side of the substrate) by a well-known spin coating method and the like. The organic insulating film PASo is formed of, for example, a photosensitive organic material such as polyimide or acrylic resin and planarizes the irregularities on the upper surface of the first substrate caused by the formation of the thin film transistor TFT, the gate lines GL, the drain lines DL, the common lines CL, and the like. In the first substrate SUB1 of the liquid crystal display device of Embodiment 1, the inorganic insulating film PAS1 and the organic insulating film PASo constitute the protective film.

The transparent conductive film ITOc serving as the common electrode CT is formed on the organic insulating film PASo. A capacitor insulating film PAS2 is formed on the transparent conductive film ITOc. The contact hole reaching the pad PD is formed through the capacitor insulating film PAS2, the organic insulating film PASo, and the inorganic insulating film PAS1, whereby the transparent conductive film ITOs serving as the pixel electrode PX formed on the capacitor insulating film PAS2 is electrically connected with the source electrode ST.

As described above, in the liquid crystal display device of Embodiment 1, the transparent conductive film ITOs serving as the pixel electrode PX is arranged via the capacitor insulating film PAS2 formed on the transparent conductive film ITOc serving as the common electrode CT. In the thus formed liquid crystal display device (lateral electric field type liquid crystal display device), the transparent conductive film ITOs serving as the pixel electrode PX and the transparent conductive film ITOc serving as the common electrode CT generally also function as a pair of electrodes for forming a holding capacitor Cst1. That is, the capacitor insulating film PAS2 is used as an inter-layer insulating film formed between the transparent conductive film ITOs serving as the pixel electrode PX and the transparent conductive film ITOc serving as the common electrode CT, thereby realizing insulation between the transparent conductive film ITOs and the transparent conductive film ITOc. At the same time, the transparent conductive film ITOs and the transparent conductive film ITOc realize a holding capacitor necessary for holding pixel charge.

In the liquid crystal display device of Embodiment 1 shown in FIGS. 2 and 3, although the case has been described in which two linear electrodes are formed as the pixel electrode PX by using the transparent conductive film ITOs serving as the pixel electrode PX for simplifying the description, this is not restrictive. Two or more linear electrodes may be formed in the pixel region by using the transparent conductive film ITOs serving as the pixel electrode PX. In addition, the forming direction of the linear electrode is not limited to the forming direction of the drain line DL but may be the forming direction of the gate line GL or may be tilted by 45° or −45° from the forming direction of the drain line DL, and the like. Further, a planar electrode may be connected to the source electrode ST of the thin film transistor TFT, and the linear electrode may be connected to the common line CL.

Figure 4:
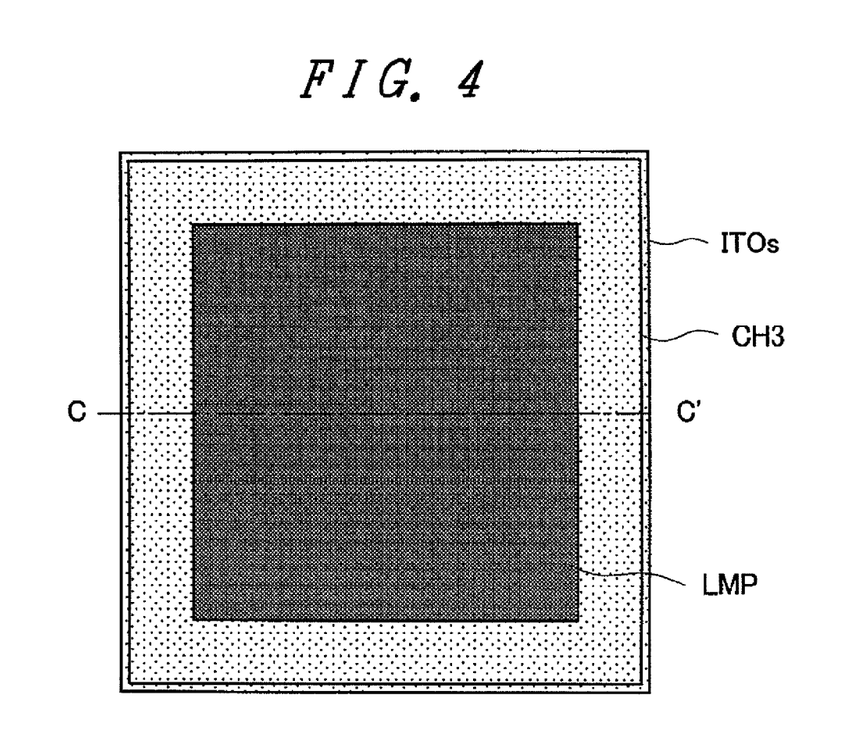
FIG. 4 is a plan view for explaining the schematic configuration of a marking portion in the liquid crystal display device of Embodiment 1 of the invention.
Figure 5:
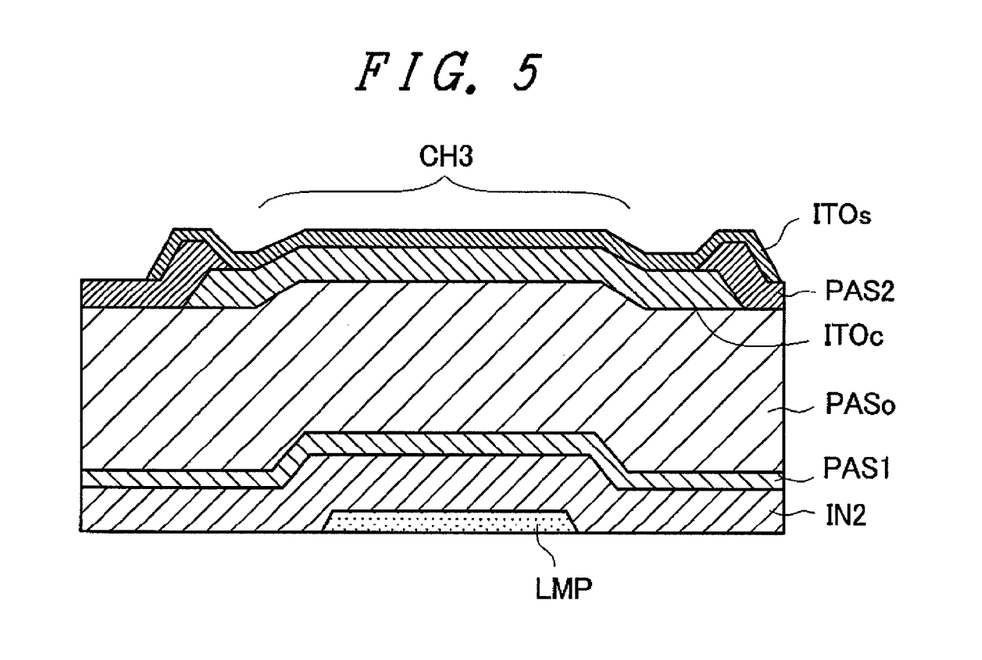
FIG. 5 is a cross sectional view taken along the line C-C' in FIG. 4 for explaining the schematic configuration of the marking portion in the liquid crystal display device of Embodiment 1 of the invention.

FIG. 4 is a plan view for explaining the schematic configuration of a marking portion in the liquid crystal display device of Embodiment 1 of the invention. FIG. 5 is a cross sectional view taken along the line C-C' in FIG. 4.

As shown in FIG. 4, the marking portion of Embodiment 1 includes the laser marking base LMP to which character information or symbolic information such as bar code (identification information) is written by a well-known laser writing process and a plurality of transparent insulating films formed on the laser marking base LMP. Especially the laser marking base LMP uses a material having low transmittance of visible light or irradiated light from a reader, such as a metal thin film which transmits a small amount of visible light or infrared light even though the film is thin, in view of visibility by an operator or the reader. As the material of the laser marking base LMP, for example, Mo (molybdenum), a W (tungsten) alloy, Al (aluminum), an Al (aluminum) alloy, or the like is preferable. In Embodiment 1, for example, an Al alloy which is the material of the drain line DL is used. When a three-layer stacked structure having an aluminum layer sandwiched between layers such as of an tungsten (W) alloy is employed for the drain line DL, the laser marking base LMP using a W (tungsten) alloy as a material can be easily formed.

In the liquid crystal display device of Embodiment 1, the transparent insulating film formed in the display region AR of the first substrate SUB1 is stacked also on the forming region of the laser marking base LMP. Although the laser marking base LMP of Embodiment 1 is formed in a square shape, this is not restrictive. The laser marking base LMP may be formed in any shape depending on the kinds of identification information used for identifying the liquid crystal display panel PNL.

Hereinafter, the configuration of the marking portion of Embodiment 1 will be described in detail based on FIGS. 4 and 5.

As shown in FIG. 5, in Embodiment 1, the laser marking base LMP is formed of a metal thin film. In Embodiment 1, for example, the laser marking base LMP is formed when the gate electrode GT is formed, whereby the laser marking base LMP is formed without adding a step of forming the laser marking base LMP. The laser marking base LMP may be formed of a most suitable material for the laser marking base LMP by newly adding the step of forming the laser marking base LMP. The laser marking base LMP may be directly formed on the first substrate SUB1. In Embodiment 1, however, the insulating film IN1 and the insulating film GI which are insulating films when the display region AR is formed are formed between the laser marking base LMP and the first substrate SUB1.

As described above, since the laser marking base LMP of Embodiment 1 is formed in the course of forming the gate electrode GT, the inter-layer insulating film IN2 is formed on the laser marking base LMP. Similarly to the display region AR, the inorganic insulating film PAS1 and the organic insulating film PASo are formed in this order on the inter-layer insulating film IN2.

In this case, the insulating film on the organic insulating film PASo in the display region AR of the liquid crystal display device of Embodiment 1 is the capacitor insulating film PAS2. On the other hand, a thin film is formed of the transparent conductive film ITOc as a material for forming the common electrode CT in a region where the laser marking base LMP is formed, that is, a region above the laser marking base LMP at a position overlapped with the laser marking base LMP in Embodiment 1. The thin film formed of the transparent conductive film ITOc as the material for forming the common electrode CT protects the organic insulating film PASo.

In the display region AR, the common electrode CT is formed on the organic insulating film PASo, and the capacitor insulating film PAS2 is formed on the common electrode CT. However, the capacitor insulating film PAS2 is not formed on the thin film formed of the transparent conductive film ITOc in the same layer as the common electrode CT in the region under which the laser marking base LMP is formed in Embodiment 1. That is, a contact hole CH3 reaching the transparent conductive film ITOc is formed through the capacitor insulating film PAS2 formed in a region other than the display region AR. The transparent conductive film ITOs of the pixel electrode material (in the same layer as the pixel electrode) is formed so as to cover the transparent conductive film ITOc of the common electrode material (in the same layer as the common electrode) on the thin film formed of the transparent conductive film ITOc for making the transparent conductive film ITOs serve as a protective film of the organic insulating film PASo. In Embodiment 1 in this case, the transparent conductive film ITOc and the capacitor insulating film PAS2 are overlapped with each other at the peripheral portion in the forming region of the contact hole.

As described above, in the liquid crystal display device of Embodiment 1, the capacitor insulating film PAS2 is not formed only in the region above the laser marking base LMP, whereby the formation of the region where the organic insulating film PASo and the capacitor insulating film PAS2 are stacked to each other is prevented in a region irradiated with laser beam.

As a result, when the transparent insulating film formed in the display region AR is also formed in the forming region of the laser marking base LMP, the occurrence of crack can be prevented in laser writing. Accordingly, the failure of the liquid crystal display device due to laser marking can be prevented.

(Embodiment 2)

Figure 6:
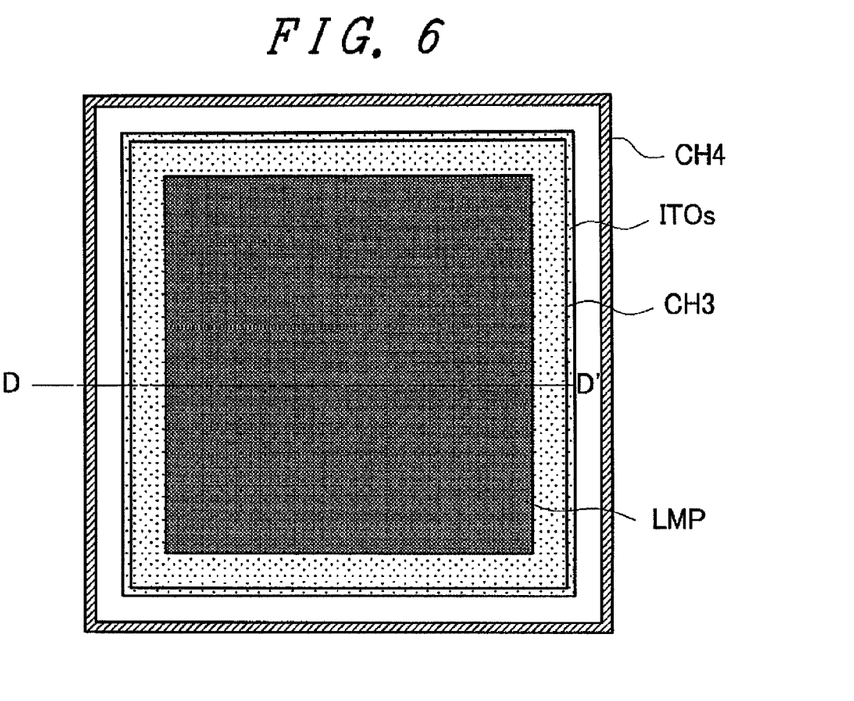
FIG. 6 is a plan view for explaining the schematic configuration of a marking portion in a liquid crystal display device of Embodiment 2 of the invention.
Figure 7:
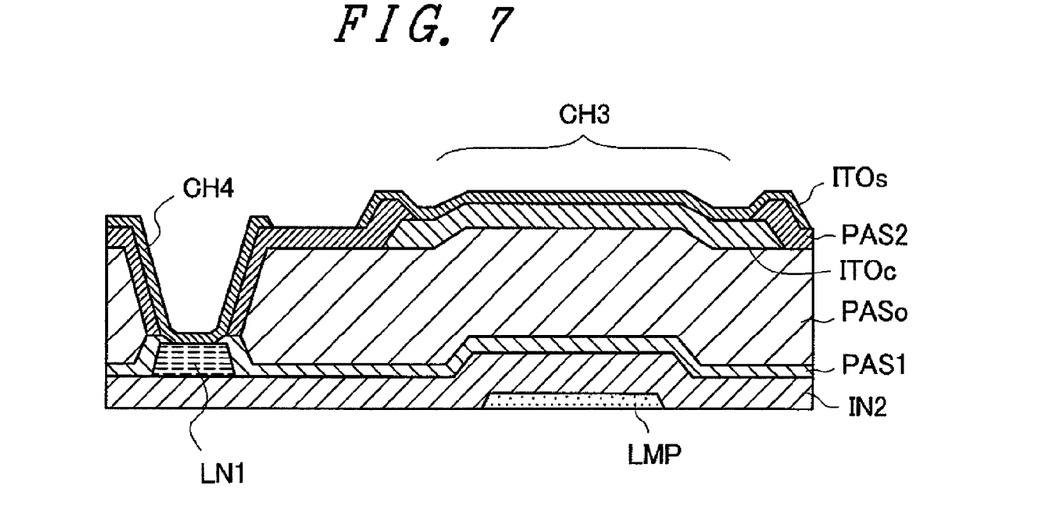
FIG. 7 is a cross sectional view taken along the line D-D' in FIG. 6 for explaining the schematic configuration of the marking portion in the liquid crystal display device of Embodiment 2 of the invention.

FIG. 6 is a plan view for explaining the schematic configuration of a marking portion in a liquid crystal display device of Embodiment 2 of the invention. FIG. 7 is a cross sectional view taken along the line D-D' in FIG. 6. Also in the liquid crystal display device of Embodiment 2, the region other than the forming region of a contact hole CH4 formed in the outer peripheral region of the laser marking base LMP is configured in the same manner as in Embodiment 1. Therefore, the configuration of the forming region of the contact hole CH4 will be described in detail below.

As shown in FIG. 6, the laser marking base LMP is formed of a metal thin film also in Embodiment 2. In the same manner as in Embodiment 1, for example, the laser marking base LMP is formed when the gate electrode GT is formed. The laser marking base LMP may be formed of a most suitable material for the laser marking base LMP by newly adding the step of forming the laser marking base LMP.

As shown in FIG. 6, in the marking portion of Embodiment 2, the contact hole CH4 is formed in the outer peripheral portion of the forming region of the thin film of the source electrode material ITOs as the protective film in the uppermost layer above the laser marking base LMP. That is, in the marking portion of Embodiment 2, a groove formed with the contact hole CH4 annularly surrounds the forming region of the laser marking base LMP.

Hereinafter, the configuration of the marking portion of Embodiment 2 will be described in detail based on FIGS. 6 and 7.

As is apparent from FIGS. 6 and 7, also in the marking portion of Embodiment 2, the insulating film formed in the region above the laser marking base LMP as a protective layer includes, from the laser marking base LMP side, the inter-layer insulating film IN2, the inorganic insulating film PAS1, the organic insulating film PASo, the transparent conductive film ITOc for forming common electrode, and the transparent conductive film ITOs for forming pixel electrode.

In this case, the feature of the configuration in Embodiment 2 is that the periphery of the forming region of the laser marking base LMP configured as described above is surrounded by the groove formed with the contact hole CH4.

That is, in Embodiment 2, after the inter-layer insulating film IN2 is formed, a metal thin film layer LN1 having a predetermined wiring width and a square shape is formed of, for example, the thin film material for forming the drain lines DL (including the drain electrode DT or the source electrode ST) so as to annularly surround the laser marking base LMP. The shape of the metal thin film layer LN1 which annularly surrounds the laser marking base LMP is not limited to a square and may be other rectangular shape or circular shape, or any closed curved shape.

After the formation of the metal thin film layer LN1, the thin film layer of the transparent conductive film ITOc as the common electrode material is formed in the same manner as in Embodiment 1. Thereafter, in Embodiment 2, the organic insulating film PASo is etched along the forming region of the metal thin film layer LN1 to form the contact hole CH4. The square groove portion which annularly surrounds the laser marking base LMP is formed with the contact hole CH4. Thereafter, the capacitor insulating film PAS2 is formed in the region including the display region AR. After the formation of the capacitor insulating film PAS2, the capacitor insulating film PAS2 formed in the region above the metal thin film layer LN1 and in the region above the laser marking base LMP (on the transparent conductive film ITOc) and the inorganic insulating film PAS1 formed in the region on the metal thin film layer LN1 are removed by etching. Thereafter, a thin film layer of the transparent conductive film ITOs as the pixel electrode material is formed on the metal thin film layer LN1 and the transparent conductive film ITOc so as to cover the removed region, whereby the thin film layer of the transparent conductive film ITOs as the pixel electrode material is formed as a protective layer for protecting the upper surface side of the metal thin film layer LN1 and the transparent conductive film ITOc.

As described above, in the liquid crystal display device of Embodiment 2, the capacitor insulating film PAS2 is not formed only in the region above the laser marking base LMP, whereby the occurrence of crack can be prevented in laser writing. Further, the groove formed with the contact hole CH4 is formed at the periphery of the forming region of the laser marking base LMP. Therefore, even when a crack occurs suddenly or accidentally in the organic insulating film PASo, the crack stops at the groove of the contact hole CH4, thereby being prevented from extending in the display region AR to cause display failure of pixel. As a result, when the transparent insulating film formed in the display region AR is also formed in the forming region of the laser marking base LMP, a defect pixel caused by the occurrence of crack in laser writing can be prevented from being generated. Accordingly, the failure of the liquid crystal display device due to laser marking can be prevented.

Further in the liquid crystal display device of Embodiment 2, since the forming regions of the contact hole CH3 and the contact hole CH4 are protected by the transparent conductive film ITOs, boundary surfaces of the thin film layers where the contact hole CH3 and the contact hole CH4 are formed (the boundary surface between the metal thin film layer and the inorganic insulating film PAS1, the boundary surface between the inorganic insulating film PAS1 and the capacitor insulating film PAS2, and the boundary surface between the capacitor insulating film PAS2 and the transparent conductive film ITOc) can be maintained stable. Therefore, the reliability of the liquid crystal display device can be further improved.

(Embodiment 3)

Figure 8:
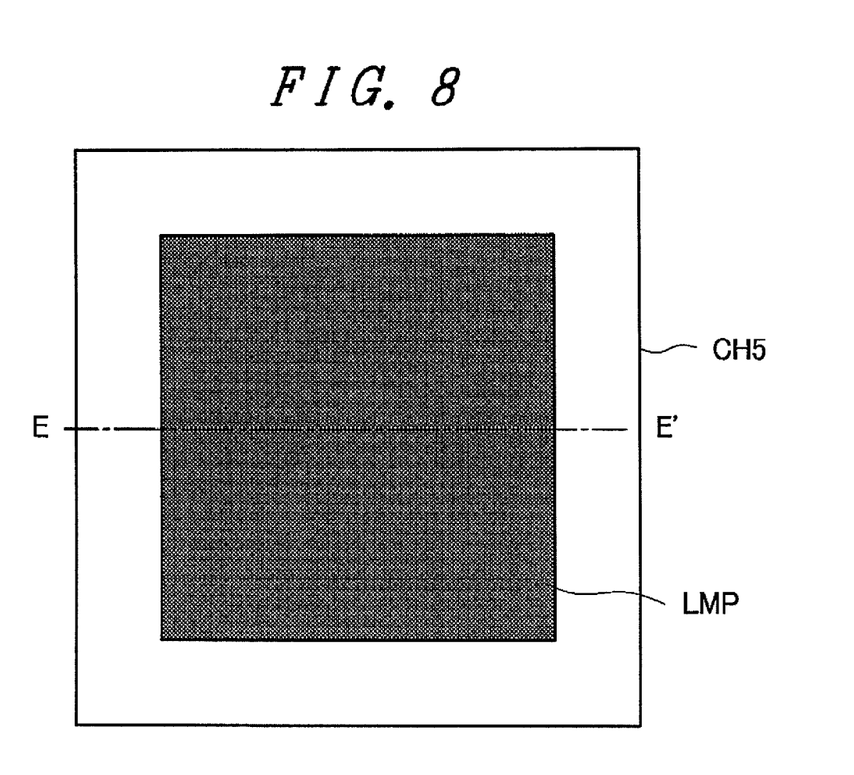
FIG. 8 is a plan view for explaining the schematic configuration of a marking portion in a liquid crystal display device of Embodiment 3 of the invention.
Figure 9:
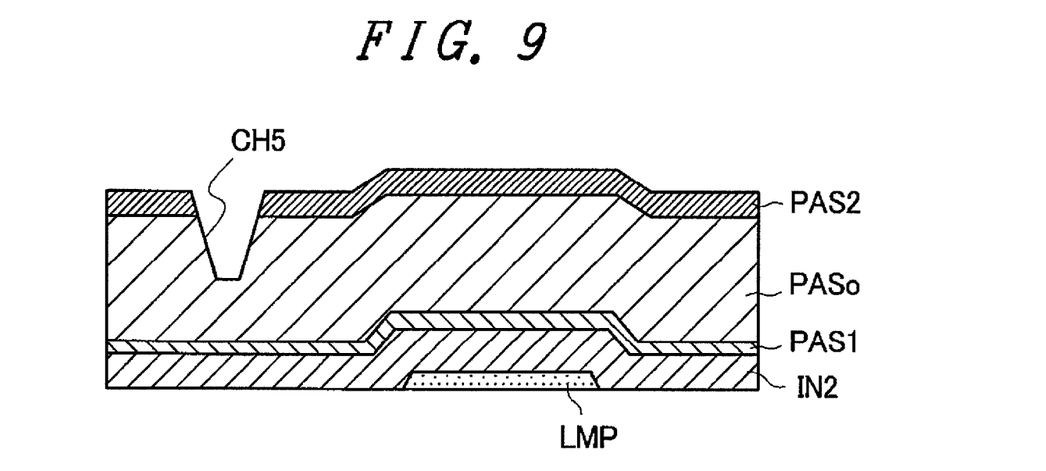
FIG. 9 is a cross sectional view taken along the line E-E' in FIG. 8 for explaining the schematic configuration of the marking portion in the liquid crystal display device of Embodiment 3 of the invention.

FIG. 8 is a plan view for explaining the schematic configuration of a marking portion in a liquid crystal display device of Embodiment 3 of the invention. FIG. 9 is a cross sectional view taken along the line E-E' in FIG. 8.

As shown in FIG. 8, the laser marking base LMP is formed of a metal thin film also in Embodiment 3. In the same manner as in Embodiment 1, for example, the laser marking base LMP is formed when the gate electrode GT is formed. The laser marking base LMP may be formed of a most suitable material for the laser marking base LMP by newly adding the step of forming the laser marking base LMP.

As shown in FIG. 8, in the marking portion of Embodiment 3, the thin film layers formed on the laser marking base LMP are configured in the same manner as described above. A groove of a contact hole CH5 is formed at the periphery of the forming region of the laser marking base LMP. The groove formed with the contact hole CH5 annularly surrounds the forming region of the laser marking base LMP.

Hereinafter, the configuration of the marking portion of Embodiment 3 will be described in detail based on FIGS. 8 and 9.

As is apparent from FIGS. 8 and 9, in the marking portion of Embodiment 3, an insulating film formed in the region on the laser marking base LMP as a protective layer of the laser marking base LMP includes, from the laser marking base LMP side, the inter-layer insulating film IN2, the inorganic insulating film PAS1, the organic insulating film PASo, and the capacitor insulating film PAS2.

In this case, the feature of the configuration in Embodiment 3 is that the periphery of the forming region of the laser marking base LMP configured as described above is surrounded by the groove formed with the contact hole CH5.

That is, in Embodiment 3, after the formation of the capacitor insulating film PAS2, the capacitor insulating film PAS2 is etched to form the contact hole CH5 so as to surround the laser marking base LMP. The square groove portion which annularly surrounds the laser marking base LMP is formed with the contact hole CH5.

As described above, in the liquid crystal display device of Embodiment 3, the groove formed with the contact hole CH5 is formed at the periphery of the forming region of the laser marking base LMP. Therefore, even when a crack occurs in the capacitor insulating film PAS2 or the organic insulating film PASo, the crack stops at the groove of the contact hole CH5, thereby being prevented from extending in the display region AR to cause display failure of pixel. As a result, when the transparent insulating film formed in the display region AR is also formed in the forming region of the laser marking base LMP, a defect pixel caused by the occurrence of crack in laser writing can be prevented from being generated. Accordingly, the failure of the liquid crystal display device due to laser marking can be prevented.

What is claimed is:

1. A display device comprising:
a display region formed on a substrate;
a non-display region excluding the display region;
a thin film layer formed in the non-display region; and
a transparent insulating film extending from the display region to the non-display region and formed on the thin film layer, wherein:
the transparent insulating film includes at least an organic insulating film which is comprised of an organic compound and which covers the thin film layer in a plan view,
an inorganic insulating film which comprises a thin film is formed on the organic insulating film and is comprised of an inorganic compound and formed with an opening extending to the organic insulating film in a region above the thin film layer, and
a transparent electrode layer is formed in the opening of the inorganic insulating film to cover the organic insulating film exposed from the opening of the inorganic insulating film.

2. The liquid crystal display device according to claim 1, wherein
the inorganic insulating film is comprised of an inorganic compound having a higher dielectric constant than those of other inorganic insulating films formed in the display region.

3. The liquid crystal display device according to claim 1, wherein
the inorganic transparent insulating film is comprised of an SIN thin film.

4. The liquid crystal display device according to claim 1, wherein
the inorganic transparent insulating film is a capacitor insulating film formed between a common electrode and a pixel electrode which constitute the pixel.

5. The liquid crystal display device according to claim 1, wherein
the thin film layer is comprised of Mo, a W alloy, Al, or an Al alloy.

6. The liquid crystal display device according to claim 1, wherein said organic insulating film substantially completely covers the thin film layer in the plan view.

7. The liquid crystal display device according to claim 6, wherein said thin film layer is formed at the same time as a gate electrode formed in the display region.

8. The liquid crystal display device according to claim 1, wherein said thin film layer is formed at the same time as a gate electrode formed in the display region.

9. The liquid crystal display device according to claim 1, wherein the thin film layer is configured for laser writing of identification information to identify the liquid crystal display device.

10. A display device comprising:
a display region formed on a substrate;
a non-display region excluding the display region;
a thin-film layer formed in the non-display region; and
a transparent insulating film extending from the display region to the non-display region and formed on the thin film layer, wherein:
wherein the transparent insulating film includes at least:
an organic insulating film comprised of an organic compound and which covers the thin film layer in a plan view,
an inorganic insulating film comprised of an inorganic compound and formed on the organic insulating film, and
a groove portion extending from the inorganic insulating film to the organic insulating film and formed so as to annularly surround a periphery of a forming region of the thin film layer,
wherein the groove portion does not overlap with the thin film layer in the plan view.

11. The liquid crystal display device according to claim 10, wherein said organic insulating film substantially completely covers the thin film layer in the plan view.

12. The liquid crystal display device according to claim 11, wherein said thin film layer is formed at the same time as a gate electrode formed in the display region.

13. The liquid crystal display device according to claim 10, wherein said thin film layer is formed at the same time as a gate electrode formed in the display region.

14. The liquid crystal display device according to claim 10, wherein the thin film layer is configured for laser writing of identification information to identify the liquid crystal display device.

15. A display device comprising:
a display region formed on a substrate;
a non-display region excluding the display region;
a thin film layer formed in the non-display region; and
a transparent insulating film extending from the display region to the non-display region and formed on the thin film layer,
wherein the transparent insulating film includes at least:
an organic insulating film comprised of an organic compound and which covers the thin film layer in a plan view,
an inorganic insulating film comprised of an inorganic compound, formed on the organic insulating film, and formed with an opening extending to the organic insulating film in a region above the thin film layer, and
a transparent electrode film which is formed in the opening of the inorganic insulating film to cover the organic insulating film exposed from the opening of the inorganic insulating film, and
a groove portion extending from the inorganic insulating film to the organic insulating film and formed so as to annularly surround a periphery of a forming region of the thin film layer,
wherein the groove portion does not overlap with the thin film layer in the plan view and is covered with the transparent electrode film.

16. The liquid crystal display device according to claim 15, wherein said organic insulating film substantially completely covers the thin film layer in the plan view.

17. The liquid crystal display device according to claim 16, wherein said thin film layer is formed at the same time as a gate electrode formed in the display region.

18. The liquid crystal display device according to claim 15, wherein said thin film layer is formed at the same time as a gate electrode formed in the display region.

19. The liquid crystal display device according to claim 15, wherein the thin film layer is configured for laser writing of identification information to identify the liquid crystal display device.

* * * * *